United States Patent
Drake, III

(10) Patent No.: US 6,874,764 B2
(45) Date of Patent: Apr. 5, 2005

(54) MECHANICAL SCREW JACK HAVING STROKE LIMITING NUT

(75) Inventor: Frank J. Drake, III, Wausau, WI (US)

(73) Assignee: Cequent Trailer Products, Inc., Mosinee, WI (US)

(*) Notice: Subject to any disclaimer, the term of this patent is extended or adjusted under 35 U.S.C. 154(b) by 0 days.

(21) Appl. No.: 10/231,637

(22) Filed: Aug. 30, 2002

(65) Prior Publication Data

US 2004/0041138 A1 Mar. 4, 2004

(51) Int. Cl.⁷ ................................................. B60S 19/02
(52) U.S. Cl. ...................................... 254/420; 254/103
(58) Field of Search .......................... 254/98, 103, 420, 254/85, 7 R, 92, 418–425

(56) References Cited

U.S. PATENT DOCUMENTS

| 612,370 A | 10/1898 | Wall | |
| 4,266,437 A | 5/1981 | Obergfell | 74/424.8 |
| 4,295,384 A | 10/1981 | Brandt et al. | 74/424.8 |
| 4,448,392 A | 5/1984 | Ladewski | 254/103 |
| 4,889,357 A | * 12/1989 | Perry | 280/475 |
| 5,053,685 A | 10/1991 | Bacchi | 318/135 |
| 6,053,064 A | 4/2000 | Gowing et al. | 74/89.15 |
| 6,099,016 A | * 8/2000 | Peveler | 280/475 |
| 6,158,720 A | * 12/2000 | Patrick et al. | 254/103 |
| 6,505,803 B1 | * 1/2003 | Hernandez | 248/354.5 |
| 2003/0063962 A1 | * 4/2003 | Nilsen | 411/427 |

* cited by examiner

Primary Examiner—Lee D. Wilson
(74) Attorney, Agent, or Firm—Todd Benni; McDonald Hopkins Co., LPA

(57) ABSTRACT

Disclosed herein is a mechanical screw jack comprising: a housing; a mechanical jack stroke limiting nut connected to the housing, the nut having a nut wall, the wall defining an interior female threaded surface and an interior screw travel limiting surface located adjacent to the interior female threaded surface; and a mechanical jack screw having an externally threaded male surface for threadably engaging the interior female threaded surface of the mechanical jack stroke limiting nut and a disruption; wherein the unthreaded screw travel limiting surface is capable of interferingly engaging at least a portion of the disruption to prevent over travel of the threaded screw. A method of limiting screw travel in a mechanical screw jack is also disclosed. Advantageously, screw travel is limited such that a user can over torque the screw, such that the screw can travel with respect to the nut without damaging the threaded portion of the nut. The invention increases mechanical screw jack life and reduces the likelihood of separation of such mechanical jacks into their component parts during repeated and vigorous use. The invention further reduces, or substantially eliminates the likelihood of a user experiencing any residual torque effect which can cause a screw jack to lock up during repeated use.

18 Claims, 3 Drawing Sheets

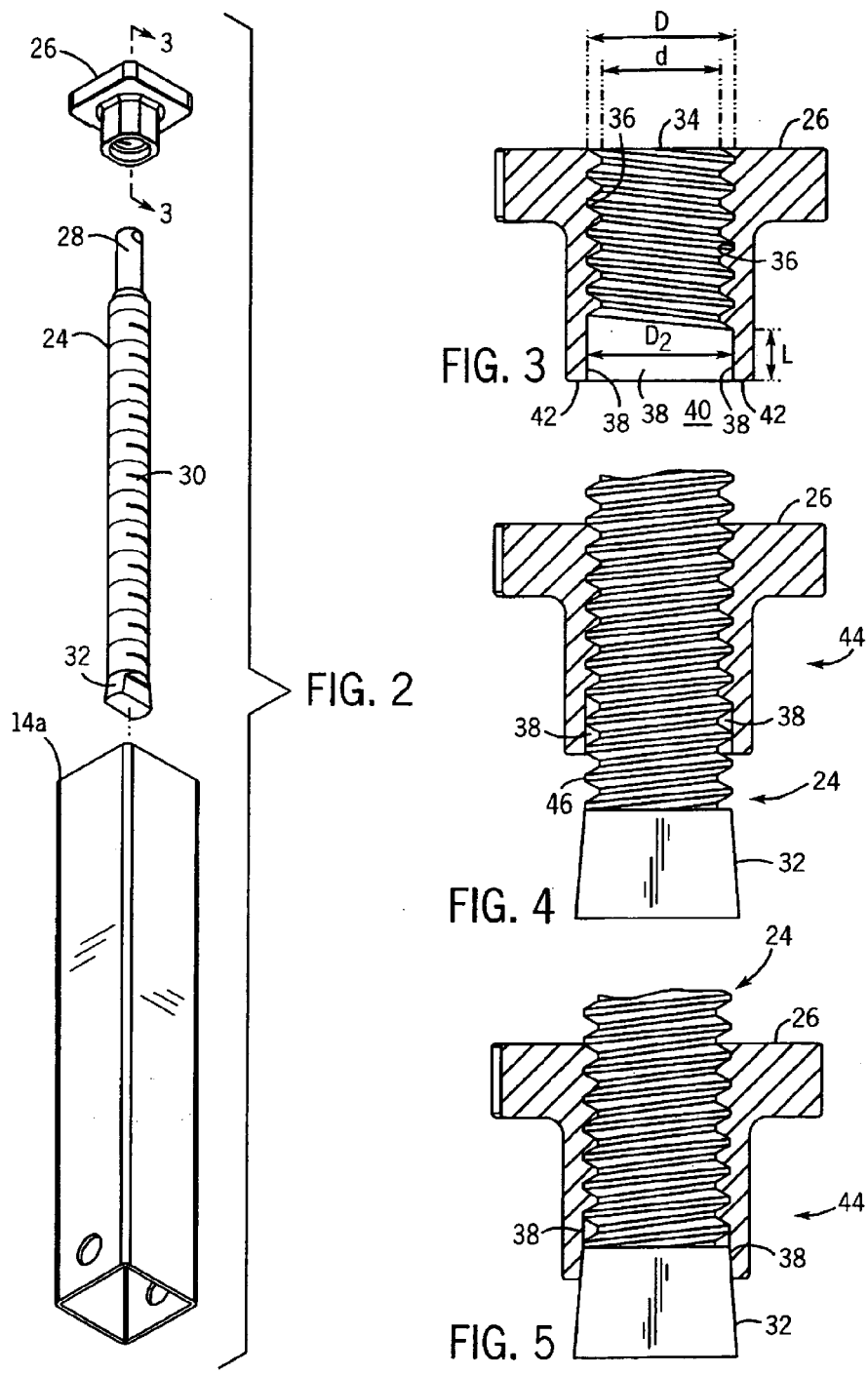

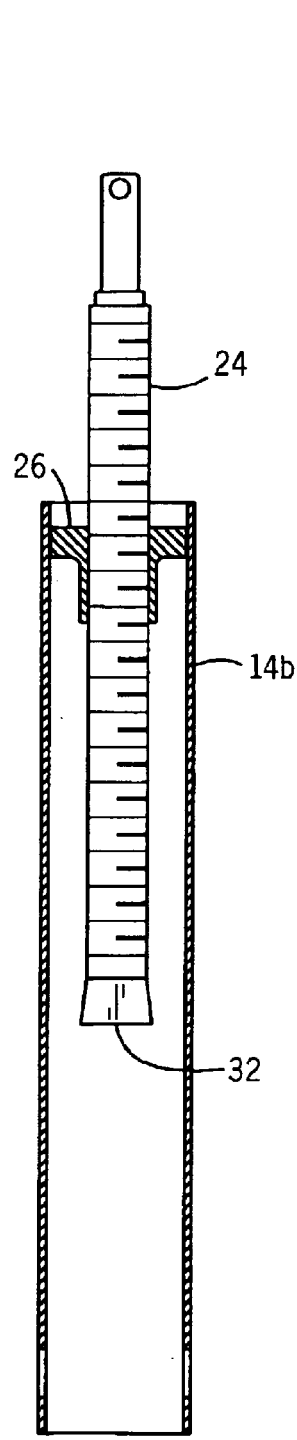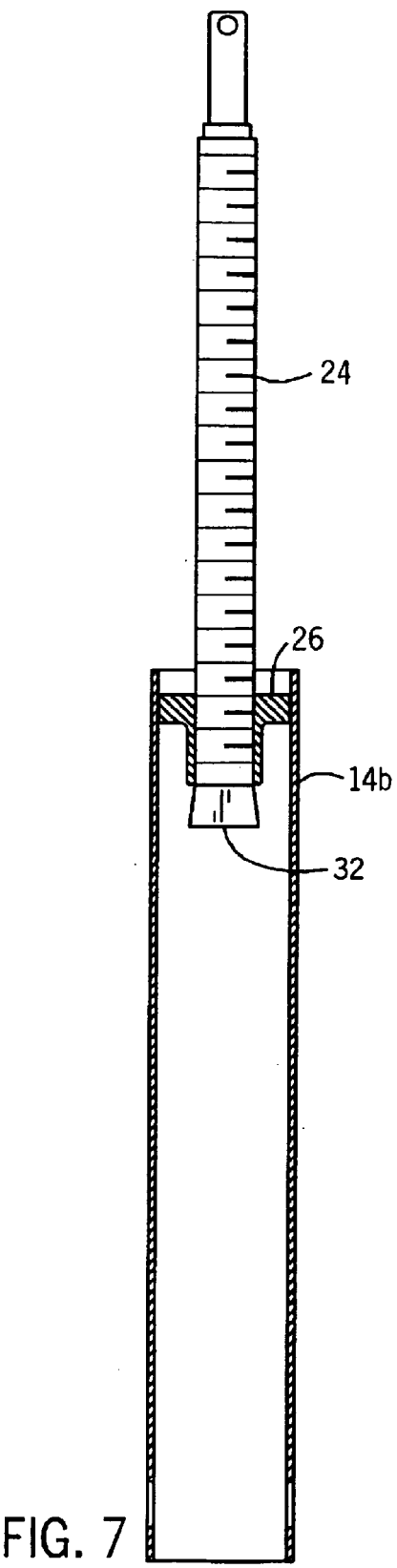
FIG. 6
FIG. 7

MECHANICAL SCREW JACK HAVING STROKE LIMITING NUT

FIELD AND BACKGROUND OF THE INVENTION

This invention relates generally to mechanical screw jacks, and more specifically to a method and apparatus for limiting the travel or stroke of a screw in a mechanical screw jack.

Mechanical screw jacks are used in applications in which large loads must be raised and lowered in a reliable, efficient, simple and safe fashion. For example, mechanical screw jacks are often used to raise and lower vehicles and/or towed attachments, including items such as cars, trucks, tractors, trailers, and agricultural implements.

Screw jacks usually include a housing having telescoping housing sections that position the jack linearly between a raised or extended position (i.e., maximum attainable length) and a lowered or retracted position (i.e., minimum attainable length). Screw jacks (by name) typically include a screw jack nut and a screw. The screw is typically in threadable engagement with the nut. A crank or other mechanism can be used to rotate gearing mechanisms (e.g., bevel gears, spur gears, etc.) which cause the screw to move with respect to the nut. Put another way, the gearing mechanism, if used, in conjunction with the screw transforms the rotational motion of the handle into linear motion of the jack. "Screw travel" refers to the movement of the screw with respect to the nut and results in a change in the overall length or height of the jack.

One of the problems associated with mechanical screw jacks is a condition known as "over travel" where the screw travels with respect to the nut beyond a desired, or designed, amount. Over travel can result in damage to the threaded portions of the screw and/or nut or even failure of the entire jack assembly. When there is permanent damage to the threaded portions of the screw and/or nut, a user may experience a phenomena known as a "residual torque effect" independent of the load being borne by the jack. The residual torque can become so great that the jack could seize or lock-up and no longer be useable under any loading circumstances. In addition, over travel can result in failure to stop screw travel possibly at a low torque, with the result that the screw is able to become disengaged from the nut. In this case, the jack could separate or fall apart.

Therefore, it would be desirable to be able to limit the screw travel and be able to apply sufficient sensible excess torque (e.g., torque or cranking effort in substantially excess of that required to typically operate the screw jack, substantial enough that the operator senses the intended travel limit) to the screw with respect to the nut without damaging the threaded portion of the nut, and as such, reduce or eliminate any residual torque effect. It would also be desirable to increase mechanical screw jack life and reduce the likelihood of separation of such mechanical jacks into their component parts during repeated and vigorous use.

BRIEF SUMMARY OF THE INVENTION

The present invention provides a mechanical screw jack having a stroke limiting nut that overcomes the aforementioned problems.

In accordance with one aspect of the present invention, a mechanical jack stroke limiting nut is disclosed. The nut comprises a nut wall. The wall defines an interior threaded surface and an interior unthreaded screw travel limiting surface located adjacent to the threaded surface.

In accordance with another aspect of the present invention, a mechanical screw jack stroke limiting nut and screw combination is disclosed. The combination comprises a mechanical jack screw having an externally threaded male surface and a disruption. The combination further comprises a mechanical jack stroke limiting nut having a nut wall. The wall defines an interior female threaded surface for engaging the externally threaded male surface of the screw and an interior unthreaded screw travel limiting surface located adjacent to the female threaded surface. The limiting surface is capable of interferingly engaging at least a portion of the disruption to limit travel of the threaded screw.

In accordance with yet another aspect of the present invention, a mechanical screw jack is disclosed. The jack comprises a housing. The jack further comprises a mechanical jack stroke limiting nut connected to the housing, the nut having a nut wall. The wall defines an interior female threaded surface and an interior screw travel limiting surface located adjacent to the interior female threaded surface. The jack further comprises a mechanical jack screw having an externally threaded male surface for threadably engaging the interior female threaded surface of the mechanical jack stroke limiting nut and a disruption. The unthreaded screw travel limiting surface is capable of interferingly engaging at least a portion of the disruption to prevent over travel of the threaded screw.

And in accordance with still another aspect of the present invention, a method of limiting screw travel in a mechanical screw jack is also disclosed. The method comprises providing a mechanical jack screw having an externally threaded male surface and a disruption and further providing a mechanical jack stroke limiting nut having a nut wall. The wall defines an interior female threaded surface and an interior unthreaded screw travel limiting surface located adjacent to the interior female threaded surface. The method further comprises advancing the screw with respect to the nut such that the interior female threaded surface mates with the externally threaded male surface of the screw. The method still further comprises interferingly engaging the screw travel limiting surface with at least a portion of the disruption so as to limit travel of the screw in the mechanical screw jack.

Various other features, objects and advantages of the present invention will be made apparent from the following detailed description and the drawings.

BRIEF DESCRIPTION OF THE DRAWINGS

The drawings illustrate the preferred modes presently contemplated for carrying out the invention.

In the drawings:

FIG. 2 is an exploded isometric view of a portion of the screw jack of FIG. 1 showing a housing, a threaded screw and a stroke limiting nut;

FIG. 3 is a cross-sectional view taken along line 3—3 of FIG. 2 showing the stroke limiting nut having an unthreaded screw travel limiting surface according to one aspect of the present invention;

FIG. 4 is a cross-sectional view similar to that of FIG. 3 showing a mechanical screw jack stroke limiting nut and screw combination comprising a mechanical jack screw in mating engagement with the stroke limiting nut in accordance with one aspect of the present invention;

FIG. 5 is a cross-sectional view similar that of FIG. 4 showing the mechanical screw jack stroke limiting nut and screw combination where the unthreaded screw travel limiting surface of the nut is interferingly engaging a disruption formed in the screw;

FIG. 6 is schematic cross sectional view of a portion of the mechanical screw jack showing the screw shown prior to the disruption interferingly engaging the screw travel limiting surface of the nut; and FIG. 7 is a schematic cross sectional view of the mechanical screw jack similar to that of FIG. 6 showing the unthreaded screw travel limiting surface of the nut interferingly engaging the disruption in the screw.

DETAILED DESCRIPTION OF THE INVENTION

Figure 1:
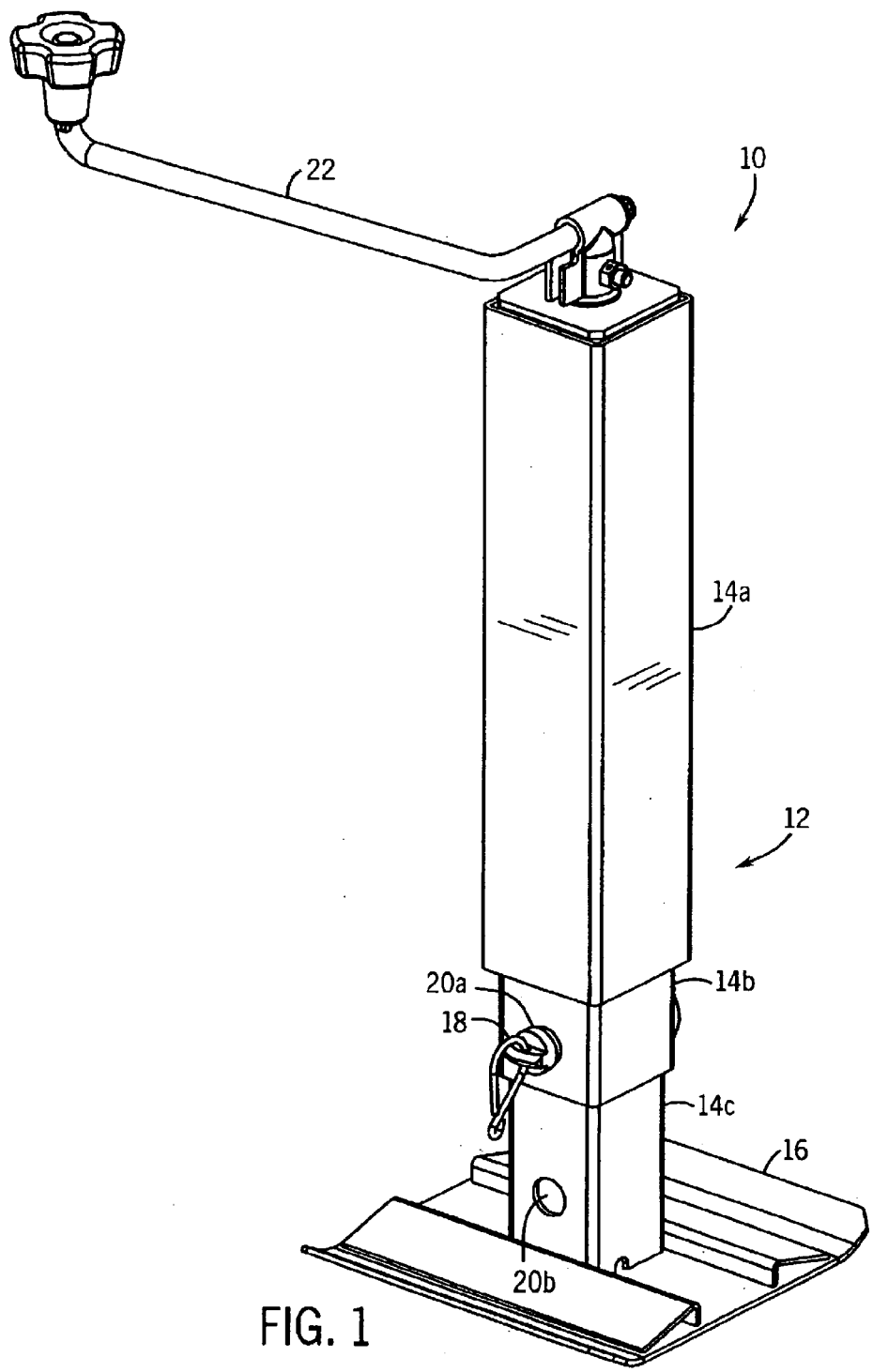
FIG. 1 is an isometric view of a mechanical screw jack incorporating the present invention.

In the Figures, like numerals are employed to designate like parts through the drawings, and various pieces of equipment, such as fittings, fasteners and the like, are omitted so as to simplify the description of the invention. However, those skilled in the art will realize that such conventional mechanical means and equipment can be employed as desired without departing from the spirit and scope of the present invention.

FIG. 1 shows an isometric view of a mechanical screw jack identified generally by the numeral 10. Screw jack 10 includes a housing 12, including housing sections 14a–c, with housing 14c secured to and supported by base 16. Housing section 14b is height adjustable with respect to housing section 14c using a pin 18 that is insertable into hole 20a (as shown) in housing section 14b, or alternatively, hole 20b in housing section 14c. Crank assembly 22 can be used in a conventional manner to raise and lower housing section 14a with respect to housing sections 14b–c, which, as a result, raises and lowers the mechanical screw jack for its intended purpose. Put another way, housing sections 14a–c are in telescoping relationship to one another. As shown, crank or crank assembly 22 is a topwind crank assembly. However, it is contemplated that other crank types can be used, such as a sidewind crank, generally employing gearing mechanisms as previously mentioned.

FIG. 2 is an exploded isometric view of a portion of the screw jack of FIG. 1 showing housing section 14b, mechanical jack screw 24 and mechanical jack stroke limiting nut 26. Screw 24 includes an insertion end 28 for insertion through nut 26 and connection to crank assembly 22 (FIG. 1). Screw 24 further includes externally threaded surface 30 and, as shown, a disruption 32.

FIG. 3 is a cross-sectional view of stroke limiting nut 26 taken along line 3—3 of FIG. 2. Nut 26 includes nut wall 34 and the wall 34 defines interior threaded surface 36 and interior unthreaded screw travel limiting surface 38 located adjacent to threaded surface 36. As shown, nut wall 34 terminates at end 40 with nut rim 42, and unthreaded screw travel limiting surface 38 extends from the threaded surface 36 to the nut rim 42. Interior threaded surface 36 defines major diameter D and minor diameter d and screw travel limiting surface 38 defines unthreaded screw travel limiting surface diameter $D_2$ that is equal to or greater than major diameter D of interior threaded surface 36. Screw travel limiting surface 38 has a length L that is determined by a distance measured from nut rim 42 to the beginning of threaded surface 36. Length L can vary to convenience with the proviso that it is of such a length that it can ensure that disruption 32 will be prevented from contacting threaded surface 36. In general, length L can be reduced as to the profile of the disruption 32 widens more abruptly or steeply.

FIG. 4 is a cross-sectional view similar to that of FIG. 3 generally showing mechanical screw jack stroke limiting nut and screw combination 44 which includes mechanical jack screw 24 for mating engagement with, and traveling with respect to, stoke limiting nut 26. Screw travel corresponds, once again, to raising and lowering of the jack 10 (FIG. 1). Mechanical jack screw 24 includes externally threaded surface 46 and disruption 32. For simplicity, only a portion of threaded surface 46 is shown.

Disruption 32, as shown, has a disruption profile that widens so as to interferingly engage with screw travel limiting surface 38. In a preferred embodiment, disruption 32 is a deformation or deformed portion of screw 24 that can be formed by crimping, compressing or otherwise deforming a portion of screw 24 to create the deformation. More specifically, the disruption 32 can be created by applying a compressive force to a portion of male threaded surface 46 to create a widen deformation profile capable of interferingly engaging with screw travel limiting surface 38. For clarity, disruption 32 is shown schematically. Although not shown, it is also contemplated that the disruption 32 includes a separate mechanical item, article, or assembly, (e.g., a nut, a washer or a nut-washer combination) that can be connected to the screw 24.

Disruption 32 is illustrated schematically. It should be understood that one goal of the disruption 32 is to provide a tapering or sloping section such that its profile widens as the distance from male threaded surface 46 increases. Consequently, at some point, the width of the disruption 32 will exceed the width of diameter $D_2$ (FIG. 3), and therefore, will lodge or wedge, so as to interferingly fit, at least a portion of disruption 32 in screw limiting surface 38. It is contemplated that disruption 32 can take on many shapes and configurations, both regular and irregular (depending on the manner in which the disruption 32 is created), without departing from the spirit and scope of the present invention. In FIG. 4, disruption 32 is shown prior to interferingly engage in screw limiting surface 38.

FIG. 5 is a cross-sectional view similar that of FIG. 4 showing mechanical screw jack stroke limiting nut and screw combination 44 where disruption 32 is shown interferingly engaging in screw limiting surface 38. Advantageously, the interfering engagement between disruption 32 and surface 38 prevents damage (e.g., deformation of threads) to female threaded surface 36 (FIG. 3). Disruption 32 is not allowed to travel past length L of surface 38, and as such, even if screw 24 is over-torqued, the disruption 32 will not contact threaded surface 36. As such, the likelihood of a user experiencing a "residual torque effect" is reduced or substantially eliminated.

FIGS. 6–7 are schematic cross sectional views of a portion of the mechanical screw jack in two positions. In both positions, mechanical jack screw limiting nut 26 is connected to housing section 14b, with mechanical jack screw 24 engaging the nut 26. In FIG. 6 screw 24 is shown at an intermediate screw jack position (i.e., between its minimum and maximum heights), and such that disruption 32 is not interferingly engaging stroke limiting nut 26. However, FIG. 7 illustrates mechanical jack stroke limiting nut 26 interferingly engaging disruption 32. This position corresponds to the overall mechanical screw jack maximum attainable length or height. In general, FIGS. 6–7 are a representation of the relative positions of jack screw 24 with respect to nut 26 within the mechanical screw jack 10 as the screw 24 travels and the jack 10 is raised to the maximum attainable length.

In accordance with another aspect of the present invention, a method is disclosed for limiting screw travel in a mechanical screw jack 10. Preferably, the method includes: providing a mechanical jack screw 24 having an externally threaded surface 30 and a disruption 32 and further providing a mechanical jack stroke limiting nut having a nut wall 34, the wall 34 defining an interior female threaded surface 36 and an interior unthreaded screw travel limiting surface 38 located adjacent to the female threaded surface 36. In addition, the method includes advancing the screw 24 with respect to the nut 26 such that the interior female threaded surface 36 mates with the externally threaded male surface 30 of the screw 24. Finally, the method includes interferingly engaging the screw travel limiting surface 38 with at least a portion of the disruption 32 so as to limit travel of the screw 24 in the mechanical screw jack 10. The method has been described in a sequential fashion. Still, it should be understood that modification, rearrangement, combination, reordering, or even elimination of certain aspects or steps of the method is contemplated and considered to be within the scope of the appending claims.

In general, while the present invention has been described in terms of preferred embodiments, it is recognized that equivalents, alternatives, and modifications, aside from those expressly stated, are possible and within the scope of the appending claims.

What is claimed is:

1. A mechanical jack comprising:
    first and second housing members telescopically moveable relative to each other;
    a jack screw having a threaded surface and a disruption at one end, the jack screw extending within the first and second housing members; and
    a stroke limiting nut comprising:
        a nut wall;
        a substantially circular interior surface at least a portion of which is threaded so as to threadedly engage the jack screw; and
        a screw travel limiting surface located at a distal end of said nut that engages the disruption to limit travel of the jack screw.

2. The mechanical jack of claim 1 wherein the disruption has a disruption profile having a proximal portion and a distal portion wider than the proximal portion so that the proximal portion wedgingly engages the screw travel limiting surface to limit travel of the jack screw.

3. The mechanical jack of claim 2, wherein the disruption comprises an unthreaded surface.

4. The mechanical jack of claim 3 wherein the disruption profile is created by deforming a distal portion of the jack screw.

5. The mechanical jack of claim 4, wherein the deformation of the distal portion of the jack screw is formed by applying a compressive force to the threads of the jack screw at the distal portion.

6. The mechanical jack of claim 3, wherein the disruption comprises a separate item that has a profile widening from its proximal end to its distal end.

7. The mechanical jack of claim 3, wherein the screw travel limiting surface has a length and the unthreaded disruption never travels the entire length of the screw travel limiting surface.

8. The mechanical jack of claim 2, wherein the interior threaded surface of the nut has a major diameter and the screw travel limiting surface has a diameter at the proximal portion that is substantially equal to the major diameter of the interior threaded surface and the screw travel limiting surface has a diameter at its distal end that is greater than the major diameter of the interior threaded surface so that the proximal portion wedgingly engages the screw travel limiting surface to limit travel of the jack screw.

9. The mechanical jack of claim 2, wherein wedging engagement of the screw travel limiting surface and the disruption reduces residual torque in the jack.

10. The mechanical jack of claim 1, wherein the screw travel limiting surface is located along the interior surface of said nut wall.

11. A mechanical screw jack stroke limiting nut and jack screw combination, the combination comprising:
    a jack screw having a threaded surface and a disruption at one end; and
    a stroke limiting nut comprising:
        a nut wall;
        a substantially circular interior surface at least a portion of which is threaded so as to threadedly engage the jack screw; and
        a screw travel limiting surface located at a distal end of said nut that engages the disruption to limit travel of the jack screw.

12. A The combination of claim 11, wherein the screw travel limiting surface is located along the interior surface of said nut wall.

13. The combination of claim 11, wherein the disruption has a disruption profile having a proximal portion and a distal portion wider than the proximal portion so that the proximal portion wedgingly engages the screw travel limiting surface to limit travel of the jack screw.

14. The combination of claim 13, wherein the disruption comprises an unthreaded surface.

15. The combination of claim 14, wherein the screw travel limiting surface has a length and the unthreaded disruption never travels the entire length of the screw travel limiting surface.

16. The combination of claim 14, wherein the disruption profile is created by deforming a distal portion of the jack screw.

17. The combination of claim 1, wherein wedging engagement of the screw travel limiting surface and the disruption reduces residual torque in the jack screw.

18. A method of limiting screw travel in a mechanical jack, the method comprising:
    providing first and second housing members in telescoping relation with each other;
    providing a jack screw having a threaded surface and a disruption at one end, the jack screw extending within the first and second housing members;
    providing a stroke limiting nut comprising:
        a nut wall;
        a substantially circular interior surface at least a portion of which is threaded so as to threadedly engage the jack screw; and
        a screw travel limiting surface located at a distal end of said nut that engages the disruption to limit travel of the jack screw; and
    advancing the jack screw until at least a portion of the disruption wedgingly engages the screw travel limit surface.

* * * * *